United States Patent
Chung et al.

(10) Patent No.: US 7,551,178 B2
(45) Date of Patent: Jun. 23, 2009

(54) APPARATUSES AND METHODS FOR PROCESSING GRAPHICS AND COMPUTER READABLE MEDIUMS STORING THE METHODS

(75) Inventors: Young-Jin Chung, Seongnam-si (KR); Kil-Whan Lee, Seoul (KR); Mahn-Gee Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 220 days.

(21) Appl. No.: 11/365,600

(22) Filed: Mar. 2, 2006

(65) Prior Publication Data

US 2006/0274077 A1    Dec. 7, 2006

(30) Foreign Application Priority Data

Jun. 2, 2005    (KR) .................. 10-2005-0047219

(51) Int. Cl.
 G09G 5/00 (2006.01)
 G09G 5/36 (2006.01)
 G06T 11/40 (2006.01)
 G06F 12/06 (2006.01)

(52) U.S. Cl. .................. 345/582; 345/552; 345/557; 345/572

(58) Field of Classification Search .......... 345/557, 345/572–574, 552, 582, 422
See application file for complete search history.

(56) References Cited

U.S. PATENT DOCUMENTS

| 5,758,045 A | * | 5/1998 | Moon et al. ............... 345/422 |
| 6,154,216 A | * | 11/2000 | Walton ................... 345/619 |
| 6,347,344 B1 | * | 2/2002 | Baker et al. .............. 345/519 |
| 6,433,789 B1 | * | 8/2002 | Rosman .................. 345/582 |

FOREIGN PATENT DOCUMENTS

| JP | 1993-120438 | 5/1993 |
| KR | 100221028 | 6/1999 |
| KR | 10-2001-0002990 | 1/2001 |

OTHER PUBLICATIONS

Notice To Submit Response to an Office Action of the Korean Patent Application 10-2005-0047219 dated Jul. 31, 2006 with English translation.

* cited by examiner

*Primary Examiner*—Hau H Nguyen
(74) *Attorney, Agent, or Firm*—Harness, Dickey & Pierce, P.L.C.

(57) ABSTRACT

An apparatus according to an example embodiment of the present invention, may process data of a present span. During processing, data corresponding to an address of the start data of the next span may be prefetched from the external memory device based on information related to the presently processed data. The prefetched data may store in the cache memory.

25 Claims, 7 Drawing Sheets

APPARATUSES AND METHODS FOR PROCESSING GRAPHICS AND COMPUTER READABLE MEDIUMS STORING THE METHODS

PRIORITY STATEMENT

This non-provisional application claims priority under 35 U.S.C. § 119 to Korean Patent Application No. 10-2005-0047219 filed on Jun. 2, 2005 in the Korean Intellectual Property Office (KIPO), the entire contents of which are incorporated herein by reference.

BACKGROUND

1. Field of the Invention

Example embodiments of the present invention relate to graphics (e.g., 3 dimensional (3D) graphics) processing.

2. Description of the Related Art

In related art 3D graphics applications, various blends of textures and/or colors may be used to obtain more natural and/or smooth images in real-time rendered scenes. A variety of cache memories may be used to improve the performance of related art 3D graphics pipelines during rendering. For example, a texture cache memory may be used for texture filtering, a color cache memory may be used for alpha blending, and a z/stencil or depth/stencil cache memory may be used for a z and/or a stencil test.

Cache memories may be used to decrease the likelihood (e.g., prevent) stall within the 3D graphics pipeline due to increased latency resulting from, for example, accessing external memory devices from a 3D graphics pipeline. However, this may affect the performance of the 3D graphics pipeline.

A 3D graphics pipeline may render a scene based on triangles, and units of spans in each triangle. When reading data (e.g., texture data, color data and/or z-data) for a span currently being rendered and/or processed, from an external memory device, the 3D graphics pipeline may read the address (e.g., coordinate) of the data and the corresponding data in advance. The address and data may be stored in a cache memory. When the 3D graphics pipeline renders the scene, a cache memory miss probability ratio increases with a change in span.

If a cache memory miss occurs each time the span in a triangle changes, the latency of the 3D graphics pipeline may increase. This may cause the 3D graphics pipeline to stall.

SUMMARY OF THE INVENTION

Example embodiments of the present invention provide apparatuses and methods for prefetching the first data of the next span into a cache memory while the present span is being processed. Example embodiments of the present invention may improve the performance of the cache memory in a graphics pipeline, for example, by reducing the occurrence of a cache miss in each triangle when the span changes. Example embodiments of the present invention also provide a computer readable medium storing the method.

In an example embodiment of the present invention, data of a first span may be processed. While data of the first span is processed, data corresponding to a coordinate of a first data of a subsequent second span from an external memory device may be prefetched to a cache memory.

Another example embodiment of the present invention may include a rasterizer and a processor. The rasterizer may render data of a first span and outputting fragment information. The processor may calculate the coordinate of a first data of a second span based on the fragment information output from the rasterizer, may output a calculated coordinate.

Another example embodiment of the present invention may include an address generator and a controller. The address generator may receive values obtained by partially differentiating a coordinate of a texture with respect to a coordinate of a pixel of a first span and an inclination of an edge of a triangle including the first span and may calculate an address of a first data of a second span based on received values and the inclination of an edge of a triangle. The controller may received an address of the first data of the second span output from the address generator, may check the operational state of a cache memory and may transmit the received address of the first data to the cache memory based on the operational state of the cache memory to prefetch data corresponding to the received address of the first data from an external memory device to the cache memory.

In another example embodiment of the present invention the address generator may receive a coordinate of a pixel and an inclination of an edge of a triangle including a first span, and may calculate an address of a first data of a second span based on the coordinate and the inclination. The controller may receive the address of the first data output from the address generator, may check the operational state of a cache memory and may transmit the received first data address to the cache memory based on the operational state of the cache memory to prefetch data corresponding to the received first data address from an external memory device to the cache memory.

In another example embodiment of the present invention, a rasterizer for may render data of a first span, and output fragment information. A processor may calculate an address of a first data of a second span based on the fragment information output from the rasterizer, and may output a calculated address. A cache memory may store data corresponding to the address output from the processor and prefetched from an external memory device.

In another example embodiment of the present invention, data of a present span may be processed, and data corresponding to an address of start data of a next span may be prefetched from an external memory device based on information related to presently processed data. The prefetched data may be stored in a cache memory.

In example embodiments of the present invention, the coordinate of the first data of the second span may be calculated based on fragment information output from a rasterizer while the rasterizer processes the data of the first span. Data corresponding to the calculated coordinate from the external memory device may be read to the cache memory.

In example embodiments of the present invention, a coordinate of a texture may be partially differentiated with respect to a coordinate of a pixel of the first span and an inclination of an edge of a triangle including the first span to obtain values. A coordinate of a first texel of the second span may be calculated based on the obtained values.

In example embodiments of the present invention, a coordinate of a first pixel of the second span may be calculated based on coordinate values of a first texel of the second span, coordinate values of a texel of the first span, an inclination of an edge of a triangle including the first span, and values obtained by partially differentiating coordinate values of the first texel of the second span and coordinate values of the texel of the first span.

In example embodiments of the present invention, the coordinate of a first pixel of the second span may be calculated based on the coordinate of a pixel of the first span and an inclination of an edge of a triangle including the first span.

In example embodiments of the present invention, the coordinate of a first pixel of the second span may be calculated based on coordinate values of a pixel of the first span, coordinate values of a first pixel of the second span, and/or a constant.

In example embodiments of the present invention, whether the cache memory accesses the external memory device may be determined, and the calculated coordinate may be output to the external memory device based on a determination result. Data corresponding to the calculated coordinate may be read from the external memory device to the cache memory.

In example embodiments of the present invention, a program for causing a computer to perform one or more methods according to example embodiments of the present invention may be recorded on a computer readable recording medium.

Example embodiments of the present invention may further include a cache memory for storing data corresponding to the calculated coordinate output from the processor and prefetched from an external memory device.

In example embodiments of the present invention, the fragment information may include values obtained by partially differentiating a coordinate of a texture with respect to a coordinate of a pixel of the first span and an inclination of an edge of a triangle including the first span, and the processor may calculate the coordinate of a first texel of the second span based on the values.

In example embodiments of the present invention, the processor may calculate the coordinate of a first texel of the second span based on coordinate values of the first texel of the second span, coordinate values of the texel of the first span, the inclination, and/or the values.

In example embodiments of the present invention, the processor may include an address generator for calculating the coordinate of the first data of the second span based on the fragment information, and a controller for receiving a coordinate output from the address generator, checking the operational state of the cache memory, and transmitting a received coordinate to the cache memory based on the operational state of the cache memory.

In example embodiments of the present invention, the controller may transmit the received coordinate to the cache memory when the cache memory is in a hit state or not operational.

In example embodiments of the present invention, the processor may calculate the coordinate of a first pixel of the second span based on a coordinate of a pixel in the first span and the inclination of an edge of a triangle including the first span.

In example embodiments of the present invention, the controller may output an address of a first texel of the second span to the cache memory in response to a signal indicating a hit state or a signal indicating a state in which the cache memory does not operate. The signal may be output from the cache memory.

In example embodiments of the present invention, the cache memory may be a z cache memory, and the controller may output a coordinate of a first pixel of the second span to the z cache memory in response to a signal indicating a hit state or a signal indicating a state in which the z cache memory does not operate. The signal may be output from the z cache memory.

In example embodiment of the present invention, the cache memory may be a color cache memory, and the controller may output a coordinate of a first pixel of the second span to the color cache memory in response to a signal indicating a hit state or a signal indicating a state in which the color cache memory does not operate.

In example embodiments of the present invention, an address generator may calculate the address of the first data of the second span based on the fragment information, and a controller may receive an address output from the address generator, check the operational state of the cache memory, and transmit a received address to the cache memory based on the operational state of the cache memory.

In example embodiments of the present invention, the fragment information may include values obtained by partially differentiating a coordinate of -a texture with respect to a coordinate of a pixel of a first span and an inclination of an edge of a triangle including the first span, and the processor may calculate the coordinate of a first texel of the second span based on the values and the inclination.

In example embodiments of the present invention, the fragment information may include a coordinate of a pixel of a first span and an inclination of an edge of a triangle including the first span, and the processor may calculate the coordinate of a first pixel of the second span based on the pixel coordinate and the inclination.

BRIEF DESCRIPTION OF THE DRAWINGS

Example embodiments of the present invention will be described in detail with reference to the attached drawings in which.

DETAILED DESCRIPTION OF EXAMPLE EMBODIMENTS OF THE PRESENT INVENTION

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Figure 1:
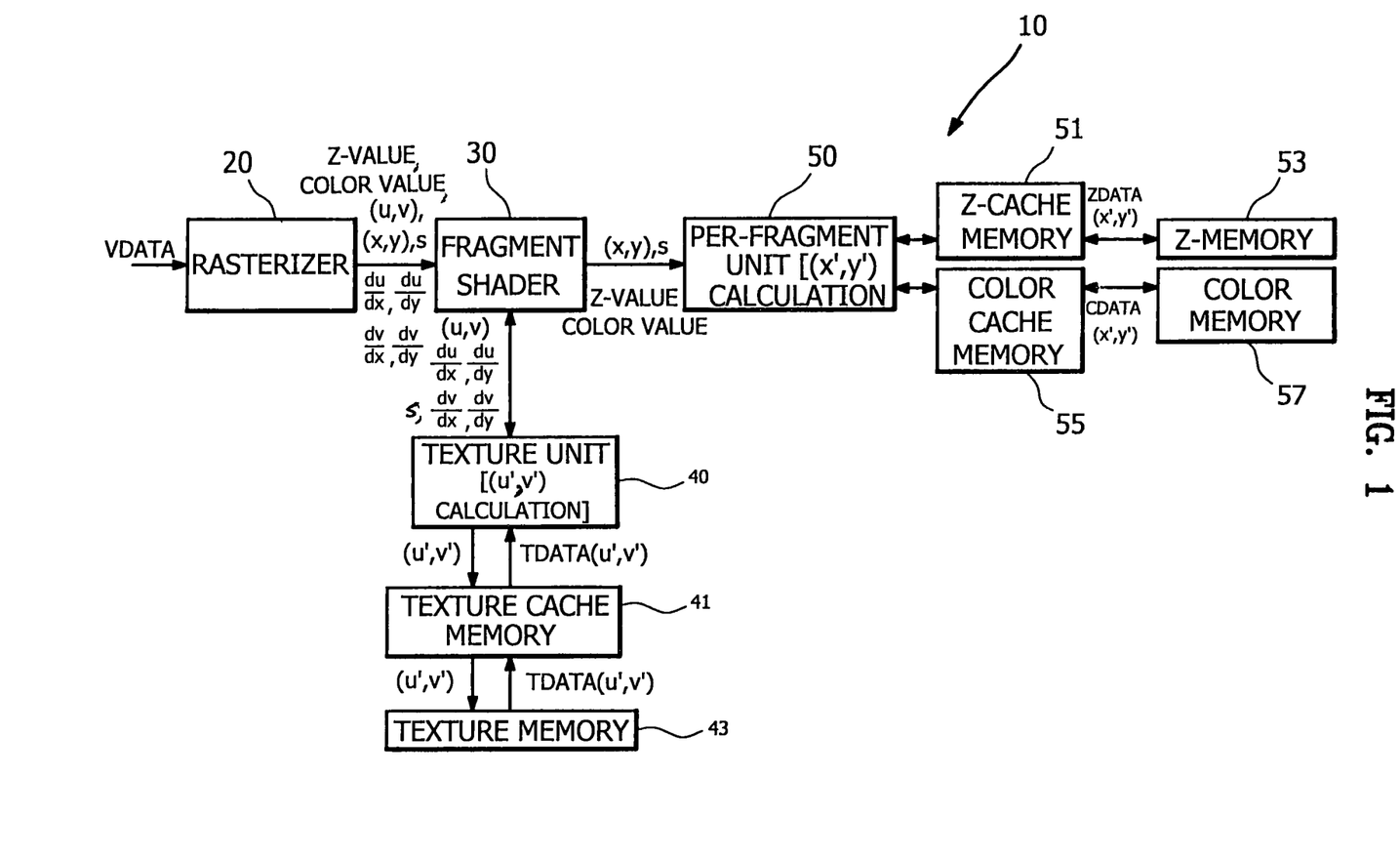
FIG. 1 is a block diagram illustrating a graphics pipeline according to an example embodiment of the present invention.

FIG. 1 illustrates a graphics pipeline (e.g., a 3D graphics pipeline) according to an example embodiment of the present invention. Referring to FIG. 1, a graphics pipeline (e.g., a graphics processing apparatus, computer, etc.) 10 may include a rasterizer 20, a fragment shader 30, a texture unit 40, a texture cache memory 41, a per-fragment unit 50, a z-cache memory 51, and a color cache memory 55.

The cache memories 41, 51 and 55 may read data from a texture memory 43, a z-memory 53 and a color memory 57, respectively. The texture memory 43, the z-memory 53 and/or the color memory 57 may be external memory devices. The cache memories 41, 51, 55 may read the data based on an address (e.g., a coordinate) generated by the texture unit 40 and the per-fragment unit 50. The texture unit 40 and/or the per-fragment unit 50 may be processors.

Figure 5:
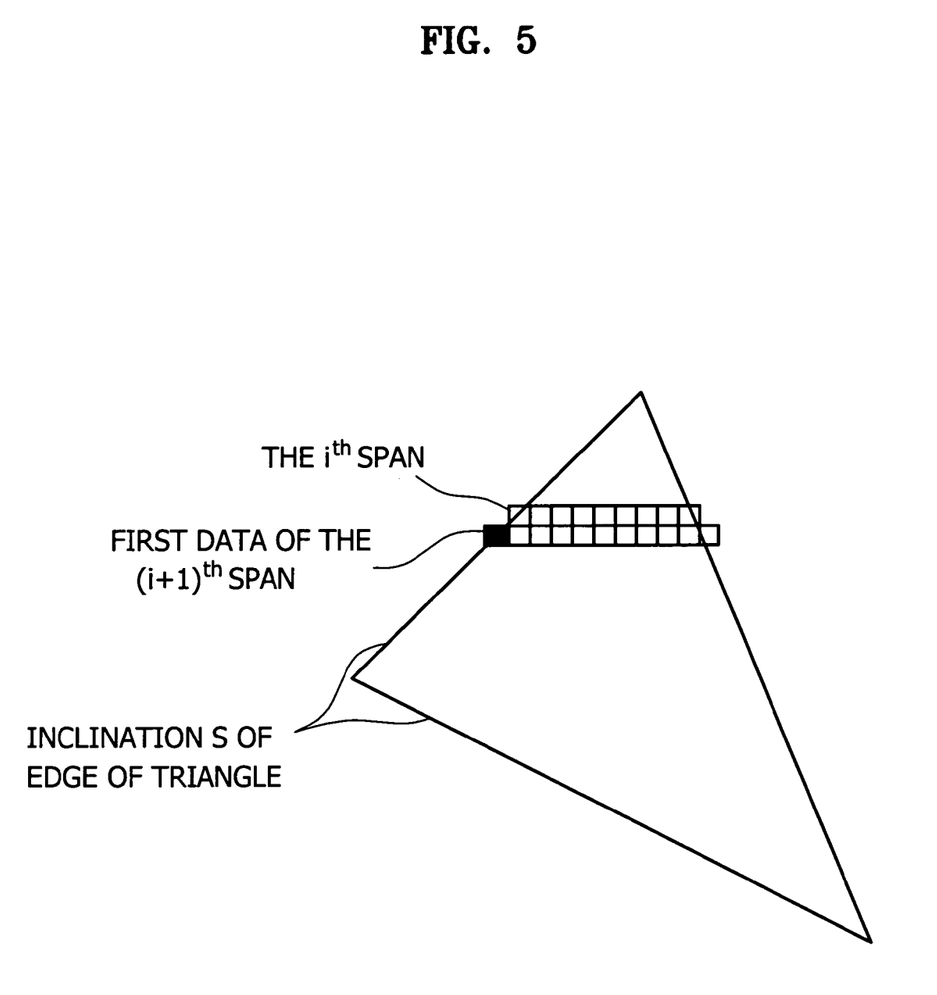
FIG. 5 illustrates a rasterization method according to an example embodiment of the present invention.

The rasterizer 20 may receive information (e.g., data) VDATA regarding coordinates of apexes of a triangle. The rasterizer 20 may render (e.g., sequentially render) spans included in the triangle as shown in FIG. 5, and may output fragment information (e.g., information related to the data of a present span, in other words, a span of the triangle presently being processed) to the fragment shader 30. Although illustrated as including a fragment shader 30, in another example embodiment of the present invention, the rasterizer 20 may output the fragment information directly to the texture unit 40 and/or the per-fragment unit 50.

The fragment shader 30 may be, for example, a processor adapted to run programs in any suitable computer programming language (e.g., OpenGL shading language, etc.). The fragment information output from the rasterizer 20 may include a color value generated by interpolation, a pixel coordinate (x, y), a z-value, a texture coordinate (u, v), an inclination (e.g., slope) of an edge of a triangle and/or values obtained through partial differentiation of the texture or texel coordinate (u, v) with respect to the pixel coordinate (x, y).

In the pipeline shown in FIG. 1, while data of a present span (e.g., an $i^{th}$ span) of the triangle is rendered or processed, the rasterizer 20 may output to the fragment shader 30 information, such as, a coordinate (u, v) of a texel of the span (e.g., the $i^{th}$ span, where i is a natural number) that is presently processed, the inclination (e.g., slope) S of an edge of a triangle including the present span, a value (du/dx) obtained by partially differentiating u in a direction x, a value (du/dy) obtained by partially differentiating u in a direction y, a value (dv/dx) obtained by partially differentiating v in the direction x, a value (dv/dy) obtained by partially differentiating v in the direction y, a pixel coordinate (x, y), a color value and a depth or z value .

Figure 2:
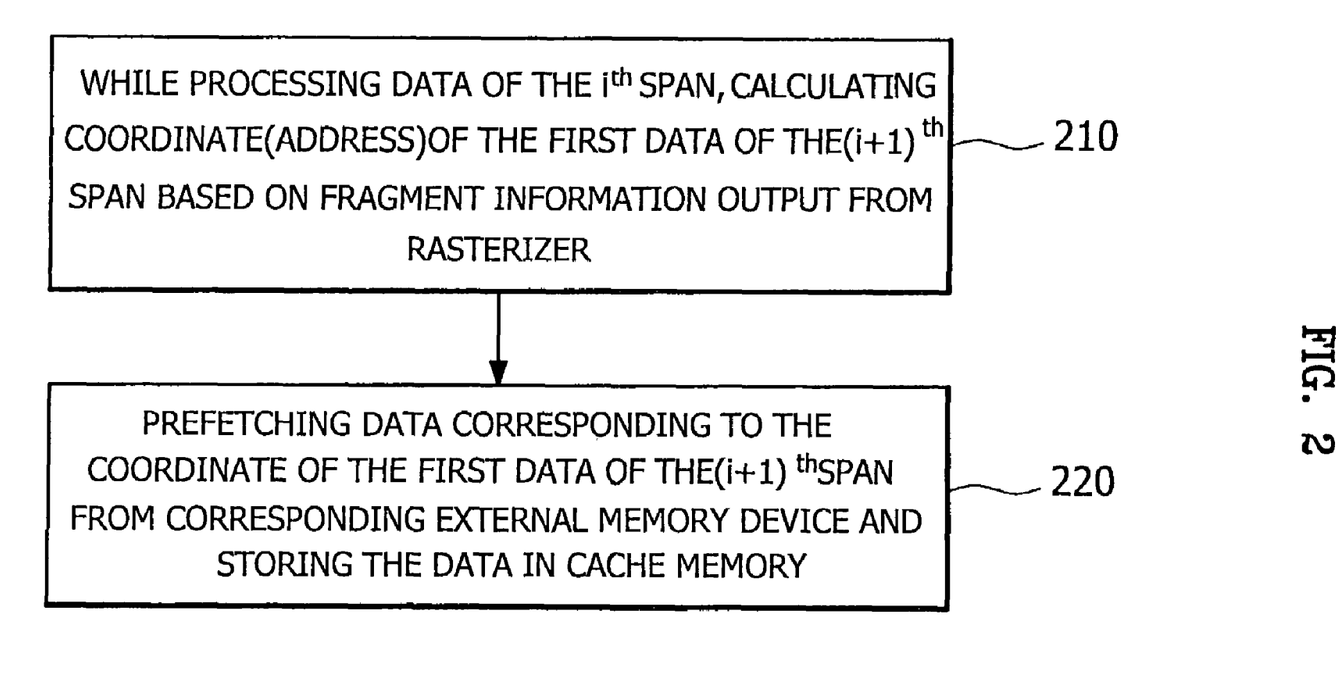
FIG. 2 is a flow chart illustrating a method of prefetching data of the next span in the graphics pipeline according to an example embodiment of the present invention.

FIG. 2 is a flow chart illustrating a method of prefetching data according to an example embodiment of the present invention of the next. Referring to FIGS. 1 and 2, while the rasterizer 20 processes or renders data of the present span (e.g., the $i^{th}$ span), each of the texture unit 40 and/or the per-fragment unit 50 may receive fragment information corresponding to the data of the present span output from the rasterizer 20. The texture unit 40 and/or the per-fragment unit 50 may calculate a coordinate, or address, of the first data of the next span (e.g., an $(i+1)^{th}$ span, where i is a natural number) based on the received fragment information at 210.

Each of the cache memories 41, 51, and 55 may prefetch data corresponding to the coordinate of the first data of the next span from the external memory devices 43, 53, and 57, respectively, at 220. For example, during processing of the data of the present span (e.g., the $i^{th}$ span), the graphics pipeline 10 may read, in advance, the first data corresponding to the coordinate of a texel and/or pixel of the next span (e.g., the $(i+1)^{th}$ span) from the external memory devices 43, 53, and/or 57. The read data may be stored in the cache memories 41, 51, and/or 55.

Figure 3:
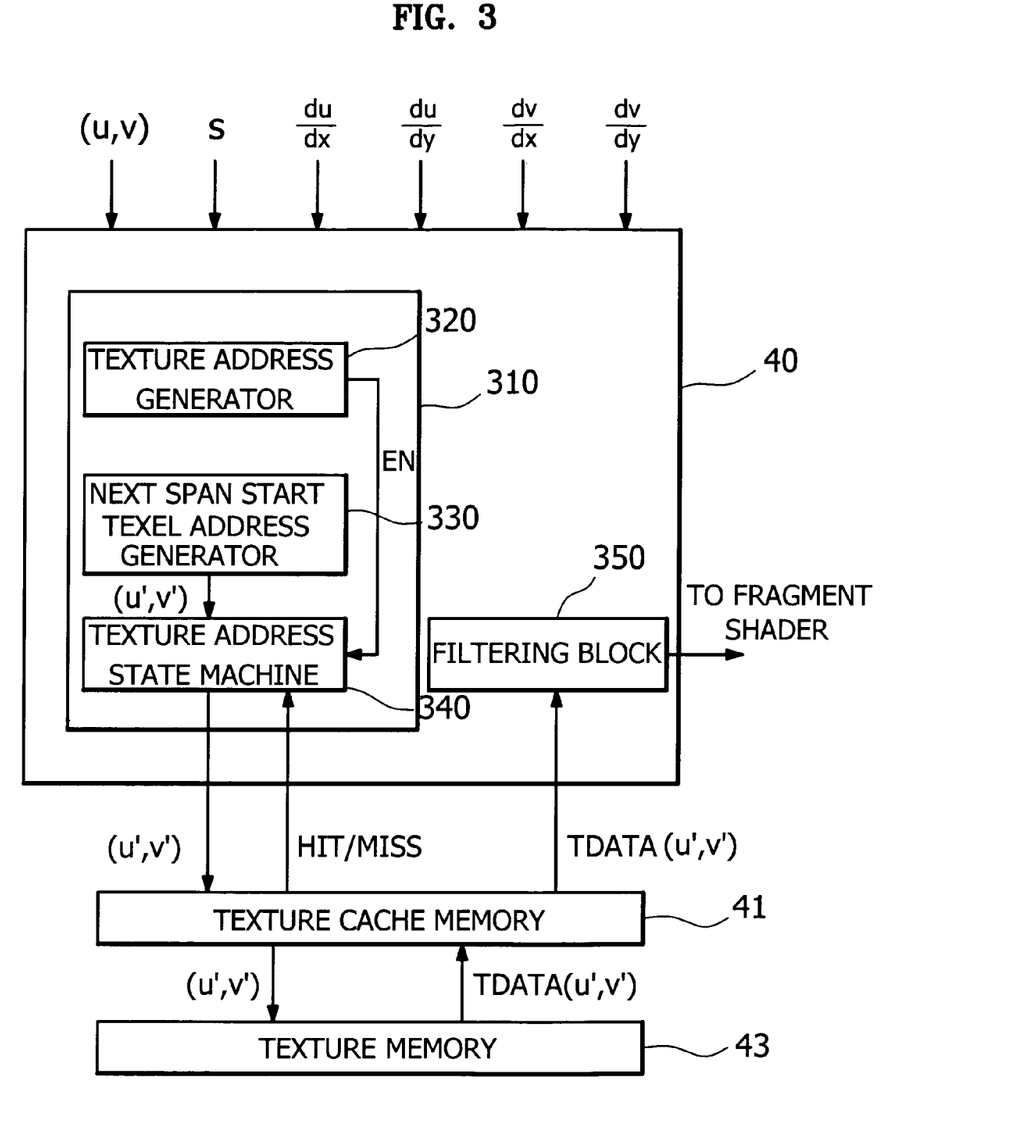
FIG. 3 is a block diagram illustrating a texture unit according to an example embodiment of the present invention.

FIG. 3 is a block diagram of a texture unit according to an example embodiment of the present invention. As shown, the texture unit 40 may include an address generating block 310 and/or a filtering block 350.

The address generating block 310 may generate a texture coordinate of a pixel of the present span (e.g., the $i^{th}$ span) and a coordinate of the first texel of the next span (e.g., the $(i+1)^{th}$ span) in response to fragment information output from the rasterizer 20. The address generating block 310 may interface with the texture cache memory 41.

The filtering block 350 may receive texel data TDATA(u', v') output from the texture cache memory 41, filter the received texel data TDATA(u', v'), and output the filtered data to the fragment shader 30.

The address generating block 310 may include a texture address generator 320, a next span start texel address generator 330 and/or a texture address state machine 340. The texture address generator 320 may generate a texel coordinate or address of a presently input pixel, for example, based on a size of a texture, an MIPMAP level, a texture storage pattern and/or a texture filtering method to obtain a texel of a pixel that is presently being rendered for texture filtering. The texture address generator 320 may generate a signal EN to control the operation of the texture address state machine 340.

Figure 4:
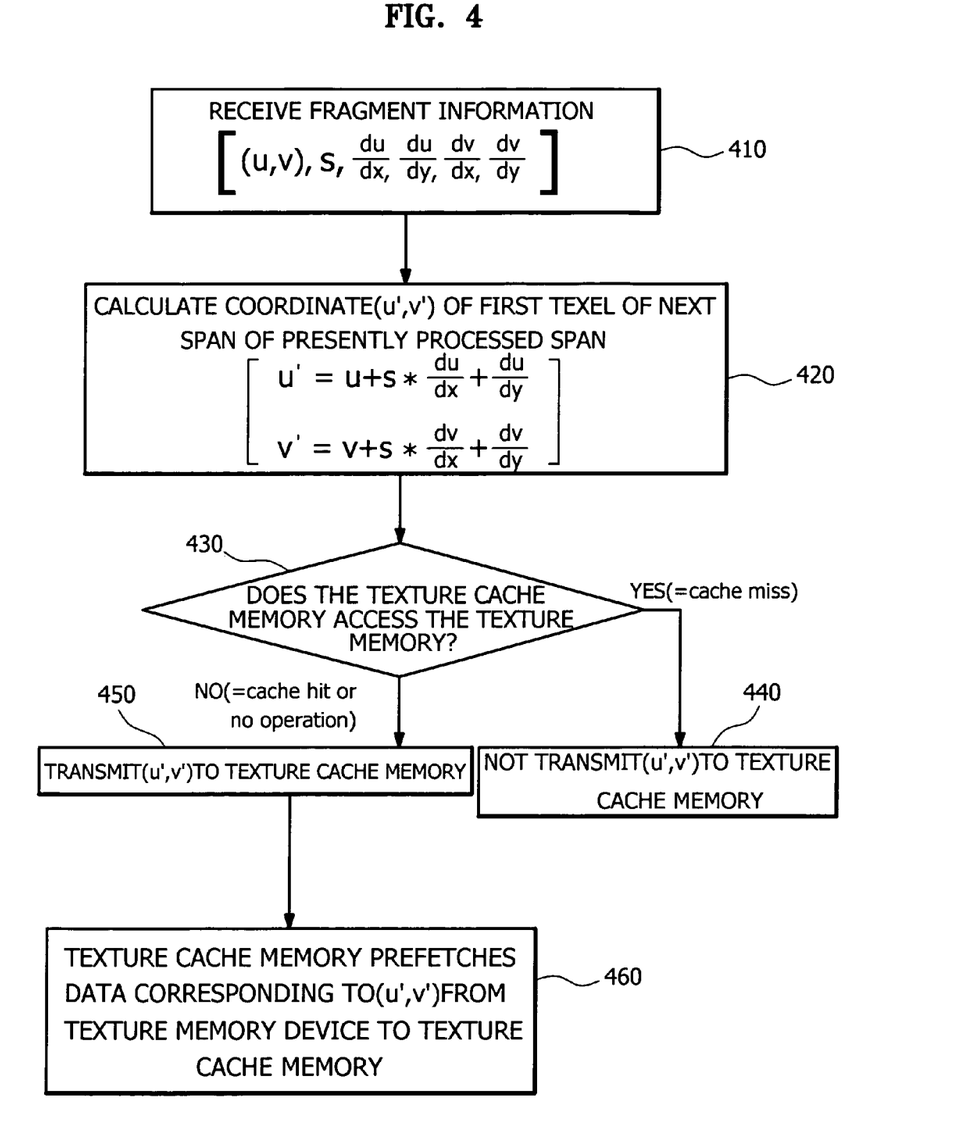
FIG. 4 is a flow chart illustrating a method for calculating a coordinate of the first texel of the next span and prefetching data corresponding to the calculated first coordinate according to an example embodiment of the present invention.

FIG. 4 is a flow chart illustrating a method for calculating a coordinate or address of a first texel of a next span and prefetching data corresponding to the calculated first coordinate or address according to an example embodiment of the present invention. FIG. 5 illustrates a rasterization method according to an example embodiment of the present invention. The rasterization method illustrated in FIG. 5 may be performed by the rasterizer 20.

Referring to FIGS. 3 to 5, the next span start texel address generator 330 may generate the coordinate or address of a first (e.g., a start) texel of the next span (e.g., the $(i+1)^{th}$ span). The next span start texel address generator 330 may receive the fragment information output from the rasterizer 20 and/or the fragment shader 30 (at 410), and may calculate the coordinate or address (u', v') of the first texel of the next span (e.g., the $(i+1)^{th}$ span) based on Equation 1 (at 420).

$$u'=u+S*du/dx+du/dy$$

$$v'=v+S*dv/dx+dv/dy \quad \text{[Equation 1]}$$

In Equation 1, u' and v' are coordinate values of a first texel of the next span (e.g., the $(i+1)^{th}$ span), u and v are coordinate values of a texel of the span being presently processed in the rasterizer 20 (e.g., the $i^{th}$ span), S is the inclination (e.g., slope) of an edge of a triangle including the presently processed span (e.g., the $i^{th}$ span), du/dx is a partially differentiated value of u in the direction x, du/dy is a partially differentiated value of u in the direction y, dv/dx is a partially differentiated value of v in the direction x, and dv/dy is a partially differentiated value of v in the direction y. The coordinate (u', v') of the first texel of the next span (e.g., the $(i+1)^{th}$ span) obtained from Equation 1 may be transmitted to the texture address state machine 340.

In response to the signal EN, the texture address state machine 340 may transmit the coordinate (u', v') of the first texel of the next span (e.g., the $(i+_1)^{th}$ span) to the texture cache memory 41 when the texture cache memory 41 is in, for example, a hit state (e.g., not operational). The texture address state machine 340 may also transmit the coordinate (u, v) for the present span (e.g., the $i^{th}$ span) to the texture cache memory 41. The texture address state machine 340 may be a controller, which may control the operation of the texture cache memory 41.

The texture address state machine 340 may check the operational state of the texture cache memory 41 (at 430), and may transmit the coordinate (u', v') of the first texel of the next span (e.g., the $(i+1)^{th}$ span), generated by the next span start texel address generator 330, to the texture cache memory 41 when the texture cache memory 41 is able to access the texture memory 43.

The texel coordinate (u, v) of the present span (e.g., the presently textured texel) and the coordinate (u', v') of the first texel of the next span may be generated at the same, or substantially the same, time. In response to the signal EN, the texture address state machine 340 may check the state of the texture cache memory 41 to determine whether to obtain the data needed by the texture unit 40 at the present time, and may process data corresponding to the coordinate (u, v) of the present span.

For example, while accessing the texture memory 43, the texture cache memory 41 may be in a miss state. When the texture cache memory 41 is in a miss state, the texture address state machine 340 may not transmit the coordinate (u', v') of the first texel of the next span to the texture cache memory 41 (at 440). When the texture cache memory 41 is not accessing the texture memory 43 (e.g., in a hit state or not operational), the texture address state machine 340 may transmit the coordinate (u', v') of the first texel of the next span to the texture cache memory 41 (at 450).

The texture cache memory 41 may read data corresponding to the coordinate (u', v') of the first texel of the next span from the texture memory 43 and may store the read data (at 460). While the present span (e.g., the $i^{th}$ span) is rendered by the rasterizer 20, the texture cache memory 41 may prefetch data corresponding to the coordinate of the first texel of the next span (e.g., the $(i+1)^{th}$ span) from the texture memory 43. The texture cache memory 41 may store the prefetched data.

In example embodiments of the present invention, miss penalties of the texture cache memory 41 may be decreased and/or performance of a graphics pipeline may be improved.

The filtering block 350 may receive data TDATA(u', v') corresponding to the coordinate (u', v') of the first texel of the next span (e.g., the $(i+1)^{th}$ span) output from the texture cache memory 41, filter the received data TDATA(u', v'), generate a texel corresponding to a pixel, and output the generated texel to the fragment shader 30. The texture unit 40 may read out at least one texel from the texture memory 43 with respect to the corresponding texture coordinate (u, v), and may filter the at least one read texel to generate another texel. The fragment shader 30 may perform texture blending and/or fog blending.

Figure 6:
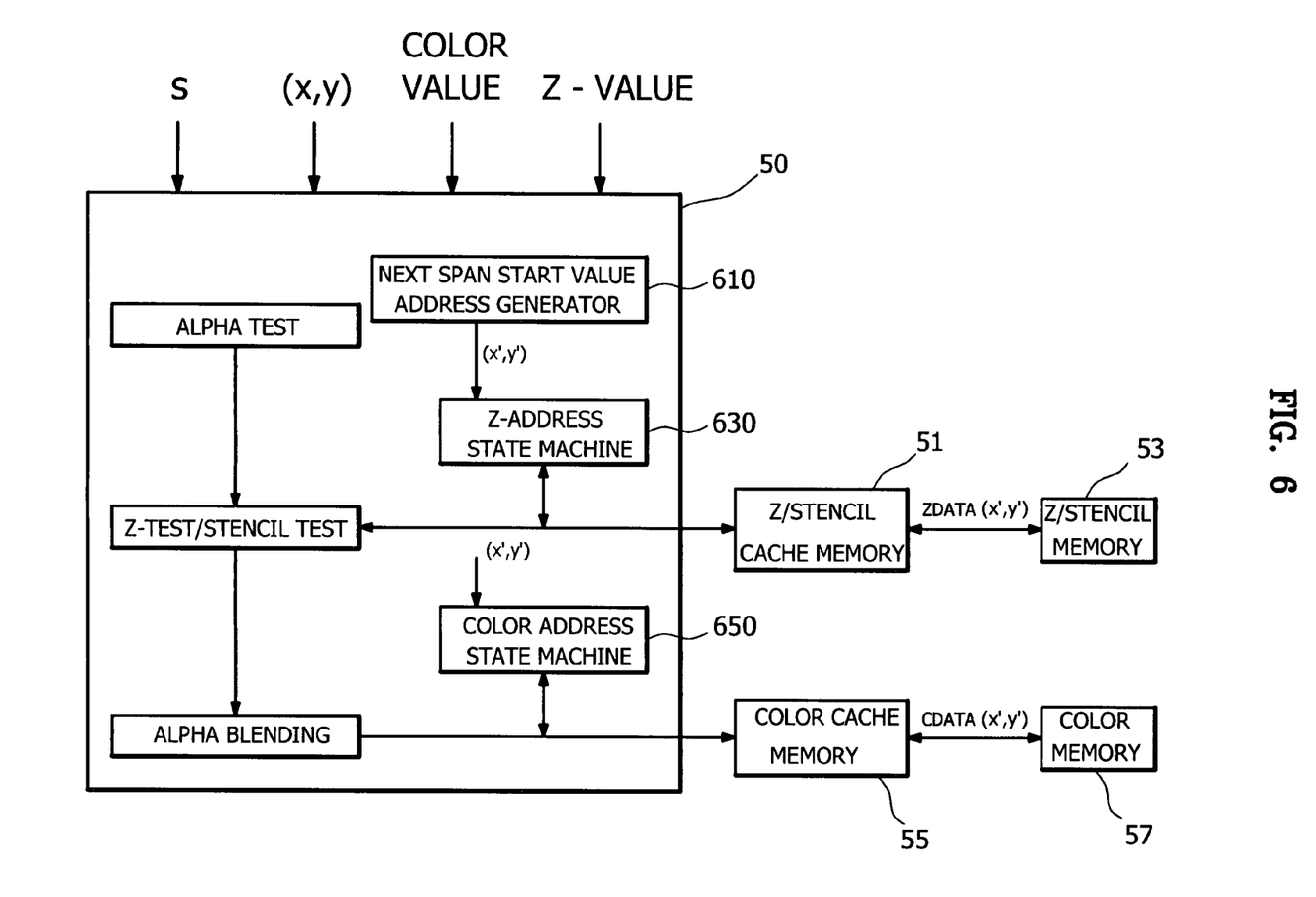
FIG. 6 is a block diagram illustrating a per-fragment unit according to an example embodiment of the present invention.
Figure 7:
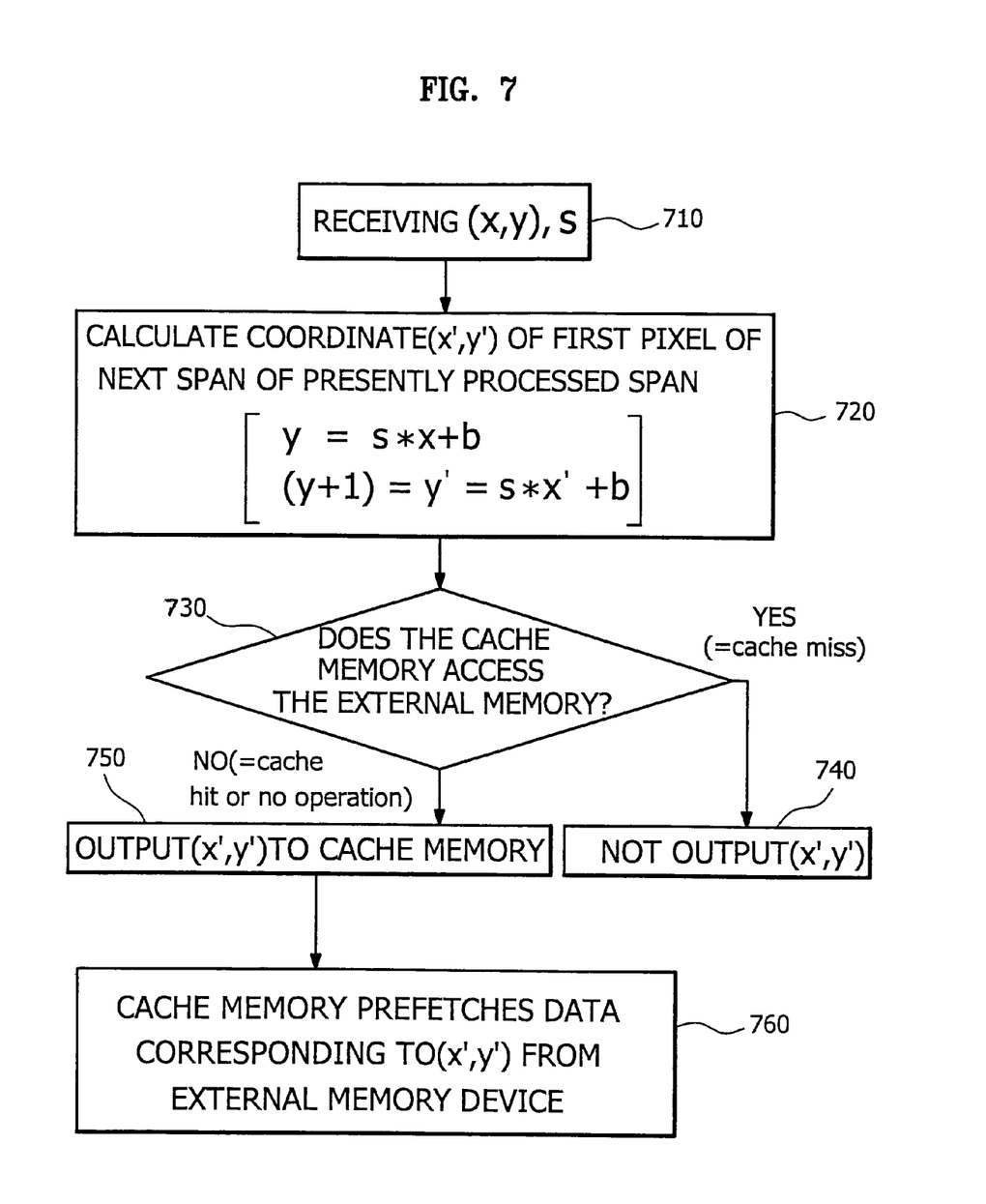
FIG. 7 is a flow chart illustrating a method of calculating the coordinate of the first pixel of the next span and prefetching data corresponding to the calculated first coordinate according to another example embodiment of the present invention.

FIG. 6 is a block diagram illustrating a per-fragment unit according to an example embodiment of the present invention. FIG. 7 is a flow chart illustrating a method of calculating the coordinate of the first pixel of the next span and prefetching data corresponding to the calculated first coordinate according to another example embodiment of the present invention. In one or more example embodiments of the present invention, the method of FIG. 7 may be performed by the per-fragment unit of FIG. 6.

Referring to FIGS. 6 and 7, the per-fragment unit 50 may include a next span start value address generator 610, a first controller, for example, a z-address (e.g., a depth address) state machine, 630 and/or a second controller, for example, a color address state machine, 650. The z-address state machine 630 and/or the color address state machine 650 may control the operation of the cache memories 51 and 55 corresponding thereto.

The per-fragment unit 50 may test an alpha value of the fragment information output from the rasterizer 20, and an alpha value of the texel filtered by the texture unit 40. The alpha value may be indicative of transparency. The z-cache (or stencil cache) memory 51 and/or the color cache memory 55 may each prefetch data corresponding to the address or coordinate of the first start value of the next span from the corresponding external memory device 53 and/or 57.

The next span start value address generator 610 may receive the inclination (e.g., slope) S of the edge of the triangle including the span (e.g., the $i^{th}$ span) being presently processed by the rasterizer 20, and the coordinate (x, y) of a pixel of the span (e.g., the $i^{th}$ span) being presently processed (at 710). The next span start value address generator 610 may calculate the coordinate or address (x', y') of the first pixel of the next span (e.g., the $(i+1)^{th}$ span) based on Equation 2 (at 720).

$$y=S*x+b$$

$$y'=y+1=S*x'+b \quad \text{[Equation 2]}$$

In Equation 2, x and y are coordinate values of a pixel of the span (e.g., the $i^{th}$ span) being presently processed, x' and y' are coordinate values of a first pixel of the next span (e.g., the $(i+1)^{th}$ span), and b is a constant.

The next span start value address generator 610 may calculate the constant b using Equation 2 because three (e.g., S, x, and y) of four variables may be known. The next span start value address generator 610 may calculate the coordinate (x', y') of the first pixel of the next span (e.g., the $(i+1)^{th}$ span) based on the calculated constant b.

The z-address state machine 630 may receive the coordinate (x', y') of the first pixel of the next span (e.g., the $(i+1)^{th}$ span) output from the next span start value address generator 610, and may check the state of the z-cache memory 51. The z-address state machine 630 may determine whether the z-cache memory 51 has accessed the z-memory 53 (at 730).

When the z-cache memory 51 accesses the z-memory 53, for example, when the z-cache memory 51 is in a miss state, the z-address state machine 630 may not output the coordinate (x', y') of the first pixel output from the next span start value address generator 610 to the z-cache memory 51 (at 740). When the z-cache memory 51 does not access the z-memory 53, for example, when the z-cache memory 51 is in the hit state or not operational, the z-address state machine 630 may output the coordinate (x', y') of the first pixel output from the next span start value address generator 610 to the z-cache memory 51 (at 750). The z-cache memory 51, in response to the coordinate (x', y') of the first pixel may prefetch the z data ZDATA(x', y') corresponding to the coordinate (x', y') of the first pixel from the z-memory 53 (at 760).

The color address state machine 650 may receive the coordinate (x', y') of the first pixel of the next span (e.g., the $(i+1)^{th}$ span) output from the next span start value address generator 610 and may check the state of the color cache memory 55. The color address state machine 650 may determine whether the color cache memory 55 may access the color memory 57 (at 730).

When the color cache memory 55 accesses the color memory 57, for example, when the color cache memory 55 is in a miss state, the color address state machine 650 may not transmit the coordinate (x', y') of the first pixel output from the next span start value address generator 610 to the color cache memory 55 (at 740).

When the color cache memory 55 does not access the color memory 57, for example, when the color cache memory 55 is in a hit state or not operational, the color address state machine 650 may transmit the coordinate (x', y') of the first pixel output from the next span start value address generator 610 to the color cache memory 55 (at 750). In response to the coordinate (x', y') of the first pixel, the color cache memory 55 may prefetch the color data CDATA(x', y') corresponding to the coordinate (x', y') of the first pixel from the color memory 57 (at 760).

The per-fragment unit 50 may perform an alpha test, depth value read calculation, z test, depth value write calculation according to the result of the z test, color value read calculation and/or alpha blending on the prefetched data.

The graphics processing apparatus, for example, a 3D accelerator, according to one or more example embodiments of the present invention, may reduce the miss penalty of the z cache memory 51 and/or the color cache memory 55, which may be generated each time the span changes in each triangle. This may improve the performance of a graphics pipeline.

Example embodiments of the present invention may be implemented, in software, for example, as any suitable computer program. For example, a program in accordance with one or more example embodiments of the present invention may be a computer program product causing a computer to execute one or more of the example methods described herein.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for performing example embodiments of the present invention, as described herein.

Further, such programs, when recorded on computer-readable storage media, may be readily stored and distributed. The storage medium, as it is read by a computer, may enable performance of example embodiments of the present invention as described herein.

The example embodiments of the present invention being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s).

Example embodiments of the present invention may be implemented, in software, for example, example embodiments of the present invention may be implemented, in software, for example, as any suitable computer program. For example, a program in accordance with one or more example embodiments of the present invention may be a computer program product causing a computer to execute one or more of the example methods described herein.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for performing one or more example embodiments of the present invention as described herein.

Further, such programs, when recorded on computer-readable storage media, may be readily stored and distributed. The storage medium, as it is read by a computer, may enable performing of one or more example embodiments of the present invention as described herein.

The example embodiments of the present invention being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s), for example, an executable computer program(s), part of externally supplied propagated signal(s), or any other suitable computer program including instructions to perform operations or functions according to example embodiments of the present invention.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for one or more example embodiments as described herein.

Further, such programs, when recorded on computer-readable storage media, may be readily stored and distributed. The storage medium, as it is read by a computer, may enable the performance of one or more example embodiments of the present invention as described herein.

Example embodiments of the present invention being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s).

The executable computer program(s) may include the instructions to perform the described operations or functions. The computer executable program(s) may also be provided as part of externally supplied propagated signal(s). Such variations are not to be regarded as departure from the spirit and scope of the example embodiments of the present invention, and all such modifications as would be obvious to one skilled in the art are intended to be included within the scope of the following claims.

In example embodiments of the present invention, the coordinate of the first data (e.g., a texel or pixel) of the next span may be received during the processing of the present span, and the data corresponding to the calculated coordinate may be prefetched from the corresponding external memory device to the corresponding cache memory, for example, the texture cache memory, the z cache memory and/or the color cache memory.

In example embodiments of the present invention, the miss penalty of the cache memory, which may occur each time the span of each triangle changes may be reduced, and/or the speed of texture filtering, z test and/or color blending may increase. When the data corresponding to the coordinate of the first data of the next span is prefetched, the performance of processing of the data of the present span may be improved. In one or more example embodiments of the present invention, the hit rate from the cache memory may be improved, the miss penalty may be reduced and/or the performance of the graphic pipeline may be improved.

While example embodiments of the present invention have been shown and described with reference to the example embodiments illustrated in the drawings, it will be understood by those skilled in the art that various changes in form and details may be made therein without departing from the spirit and scope of the present invention as defined by the claims.

What is claimed is:

1. A method for processing computer graphics data, the method comprising:

processing texel data of a first span; and prefetching texel data corresponding to a coordinate of first texel data of a subsequent second span from an external memory device to cache memory while the texel data of the first span is processed;

wherein prefetching texel data includes:

calculating the coordinate of the first texel data of the second span using the following formulas:

$u' = u + S*du/dx + du/dy$; and $v' = v + S*dv/dx + dv/dy$;

wherein u' is a first coordinate value of the first texel data of the second span, wherein v' is a second coordinate value of the first texel data of the second span, wherein u is a first coordinate value of the texel data of the first span, wherein v is a second coordinate value of the texel data of the first span, wherein S is an inclination of an edge of a triangle including the first span, wherein du/dx is a partially differentiated value of u in a direction of x, wherein du/dy is a partially differentiated value of u in a direction of y, wherein dv/dx is a partially differentiated value of v in the direction of x, and wherein dv/dy is a partially differentiated value of v in the direction of y.

2. The method of claim 1, wherein prefetching texel data further includes:

reading texel data corresponding to the calculated coordinate from the external memory device to the cache memory.

3. The method of claim 1, wherein calculating the coordinate of the first texel data of the second span includes:

calculating a coordinate of a first pixel of the second span based on u, v, u', v', S, du/dx, du/dy, dv/dx, and dv/dy.

4. The method of claim 1, wherein the coordinate is calculated based on coordinate values of a pixel of the first span, coordinate values of a first pixel of the second span, and a constant.

5. The method of claim 2, wherein reading texel data corresponding to the calculated coordinate includes:

determining whether the cache memory accesses the external memory device; and outputting the calculated coordinate to the external memory device based on a result of the determination.

6. A computer-readable recording medium recording a program adapted to cause a computer to perform the method of claim 1.

7. An apparatus for processing graphics, the apparatus comprising:

a rasterizer adapted to render texel data of a first span and adapted to output fragment information; and a processor adapted to calculate a coordinate of first texel data of a second span based on the fragment information output from the rasterizer, and adapted to output the calculated coordinate;

wherein the coordinate of the first texel data of the second span is calculated using the following formulas:

$u' = u + S*du/dx + du/dy$; and $v' = v + S*dv/dx + dv/dy$;

wherein u' is a first coordinate value of the first texel data of the second span, wherein v' is a second coordinate value of the first texel data of the second span, wherein u is a first coordinate value of the texel data of the first span, wherein v is a second coordinate value of the texel data of the first span, wherein S is an inclination of an edge of a triangle including the first span, wherein du/dx is a partially differentiated value of u in a direction of x, wherein du/dy is a partially differentiated value of u in a direction of v, wherein dv/dx is a partially differentiated value of v in the direction of x, and wherein dv/dy is a partially differentiated value of v in the direction of y.

8. The apparatus of claim 7, further including:

cache memory adapted to store texel data corresponding to the calculated coordinate output from the processor and prefetched from an external memory device.

9. The apparatus of claim 8, wherein the processor includes:

an address generator adapted to calculate the coordinate of the first texel data of the second span based on the fragment information; and a controller adapted to receive the calculated coordinate output from the address generator, adapted to check an operational state of the cache memory, and adapted to transmit the received, calculated coordinate to the cache memory based on the operational state of the cache memory.

10. The apparatus of claim 9, wherein the controller transmits the received, calculated coordinate to the cache memory when the cache memory is in a hit state or not operational.

11. The apparatus of claim 7, wherein the processor calculates the coordinate of a first pixel of the second span based on a coordinate of a pixel in the first span and S.

12. A computer system, comprising:

the apparatus of claim 7;

an external memory device; and a cache memory that stores texel data corresponding to the calculated coordinate output from the processor and prefetched from the external memory device.

13. A processor, comprising:

an address generator adapted to calculate an address of a first texel data of a second span using the following formulas:

$u' = u + S*du/dx + du/dy$; and $v' = v + S*dv/dx + dv/dy$; and a controller adapted to receive the address of the first texel data of the second span output from the address generator, adapted to check an operational state of a cache memory, and adapted to transmit the received address of the first texel data to the cache memory based on the operational state of the cache memory to prefetch data corresponding to the received address of the first texel data from an external memory device to the cache memory;

wherein u' is a first coordinate value of the first texel data of the second span, wherein v' is a second coordinate value of the first texel data of the second span, wherein u is a first coordinate value of texel data of a first span, wherein v is a second coordinate value of the texel data of the first span, wherein S is an inclination of an edge of a triangle including the first span, wherein du/dx is a partially differentiated value of u in a direction of x, wherein du/dy is a partially differentiated value of u in a direction of y, wherein dv/dx is a partially differentiated value of v in the direction of x, and wherein dv/dy is a partially differentiated value of v in the direction of y.

14. The processor of claim 13, wherein the controller outputs an address of a first texel of the second span to the cache memory in response to a signal indicating a hit state or a state in which the cache memory does not operate, and wherein the signal is output from the cache memory.

15. An apparatus for processing graphics, the apparatus comprising:

a rasterizer adapted to render texel data of the first span, and adapted to output fragment information; and a processor adapted to calculate a coordinate of the first texel data of the second span based on the fragment information output from the rasterizer, and adapted to output the calculated coordinate;

wherein the processor is the processor of claim 13.

16. A computer system, comprising:

the apparatus of claim 15;

the external memory device; and a cache memory that stores texel data corresponding to the calculated coordinate output from the processor and prefetched from the external memory device.

17. A processor, comprising:

an address generator adapted to calculate an address of a first texel data of a second span using the following formulas:

$$y=S*x+b; \text{ and}$$

$$y'=y+1=S*x'+b; \text{ and}$$

a controller adapted to receive the address of the first texel data output from the address generator, adapted to check an operational state of a cache memory, and adapted to transmit the received first texel data address to the cache memory based on the operational state of the cache memory to prefetch data corresponding to the received first texel data address from an external memory device to the cache memory;

wherein x is a first coordinate value of a pixel of a first span, wherein y is a second coordinate value of the pixel of the first span, wherein x' is a first coordinate value of the first texel data of the second span, wherein y' is a second coordinate value of the first texel data of the second span, wherein S is an inclination of an edge of a triangle including the first span, and wherein b is a constant.

18. The processor of claim 17, further comprising:

a z-cache memory.

19. The processor of claim 17, further comprising:

a color cache memory.

20. An apparatus for processing graphics, the apparatus comprising:

a rasterizer adapted to render texel data of the first span, and adapted to output fragment information; and a processor adapted to calculate a coordinate of the first texel data of the second span based on the fragment information output from the rasterizer, and adapted to output the calculated coordinate;

wherein the processor is the processor of claim 17.

21. A computer system, comprising:

the apparatus of claim 20;

the external memory device; and a cache memory that stores texel data corresponding to the calculated coordinate output from the processor and prefetched from the external memory device.

22. A computer system, comprising:

a rasterizer adapted to render texel data of a first span, and adapted to output fragment information;

a processor adapted to calculate an address of a first texel data of a second span based on the fragment information output from the rasterizer, and adapted to output the calculated address;

an external memory device; and a cache memory that stores texel data corresponding to the calculated address of the first texel data output from the processor and prefetched from the external memory device;

wherein the address of the first texel data of the second span is calculated using the following formulas:

$$u'=u+S*du/dx+du/dy; \text{ and}$$

$$v'=v+S*dv/dx+dv/dy;$$

wherein u' is a first coordinate value of the first texel data of the second span, wherein v' is a second coordinate value of the first texel data of the second span, wherein u is a first coordinate value of the texel data of the first span, wherein v is a second coordinate value of the texel data of the first span, wherein S is an inclination of an edge of a triangle including the first span, wherein du/dx is a partially differentiated value of u in a direction of x, wherein du/dy is a partially differentiated value of u in a direction of y, wherein dy/dx is a partially differentiated value of v in the direction of x, and wherein dv/dy is a partially differentiated value of v in the direction of y.

23. The computer system of claim 22, wherein the processor includes:

an address generator adapted to calculate the address of the first texel data of the second span based on the fragment information; and a controller adapted to receive an address output from the address generator, adapted to check an operational state of the cache memory, and adapted to transmit the received address to the cache memory based on the operational state of the cache memory.

24. The computer system of claim 22, wherein the fragment information includes a coordinate of a pixel of the first span and S, and wherein the processor calculates the address of the first pixel data of the second span based on the pixel coordinate and S.

25. A method for processing data, the method comprising:

processing texel data of a present span;

prefetching texel data corresponding to an address of start texel data of a next span from an external memory device based on information related to the presently processed texel data; and storing the prefetched texel data in cache memory;

wherein prefetching texel data includes:

calculating the coordinate of the start texel data of the next span using the following formulas:

$$u'=u+S*du/dx+du/dy; \text{ and}$$

$$v'=v+S*dv/dx+dv/dy;$$

wherein u' is a first coordinate value of the start texel data of the next span, wherein v' is a second coordinate value of the start texel data of the next span, wherein u is a first coordinate value of the texel data of the present span, wherein v is a second coordinate value of the texel data of the present span, wherein S is an inclination of an edge of a triangle including the present span, wherein du/dx is a partially differentiated value of u in a direction of x, wherein du/dy is a partially differentiated value of u in a direction of y, wherein dv/dx is a partially differentiated value of v in the direction of x, and wherein dy/dy is a partially differentiated value of v in the direction of y.

* * * * *